United States Patent [19]

Leonard et al.

[11] Patent Number: 4,572,446
[45] Date of Patent: Feb. 25, 1986

[54] PROCESS FOR MAKING A FIBER BUNDLE

[75] Inventors: Ronald J. Leonard, Harvard; Kenneth M. Johnson, Lindenhurst, both of Ill.

[73] Assignee: Omnis Surgical Inc., Deerfield, Ill.

[21] Appl. No.: 592,835

[22] Filed: Mar. 23, 1984

[51] Int. Cl.[4] .......................................... B65H 81/08
[52] U.S. Cl. ...................................... 242/7.02; 242/3; 242/7.14; 242/7.21; 210/321.3; 264/103
[58] Field of Search ............... 242/3, 7.14, 7.21, 7.02; 422/48; 210/321.4, 321.1, 321.2, 321.3; 264/103

[56] References Cited

U.S. PATENT DOCUMENTS

| | | | |
|---|---|---|---|
| 2,858,992 | 11/1958 | Wentz | 242/3 |
| 2,995,311 | 8/1961 | Holman | 242/3 |
| 3,111,279 | 11/1963 | Daley et al. | 242/2 |
| 3,794,468 | 2/1974 | Leonard | 422/48 |
| 4,140,637 | 2/1979 | Walter | 210/321.1 |
| 4,368,124 | 1/1983 | Brumfield | 210/321.3 |
| 4,430,219 | 2/1984 | Kuzumoto et al. | 210/321.3 |

Primary Examiner—Jan Silbaugh
Assistant Examiner—Hubert C. Lorin
Attorney, Agent, or Firm—George H. Gerstman; Paul C. Flattery

[57] ABSTRACT

A bundle (12) of hollow fiber (34) is formed by winding a length of hollow fiber around a core (38) from an arm (20) that is in a plane at an acute angle with respect to the longitudinal axis of the core and is between opposite ends of the core. Relative rotation is provided between the longitudinal axis of the core and the position of the winding arm. During winding of the hollow fiber around the core, there is an increase in the ratio of (a) the angular velocity of the wind and (b) the relative rotational velocity between the longitudinal axis of the core and the position of the winding arm. In this manner, the void fraction of radially-outward annuli of the wound bundle is less than the void fraction would be if the ratio remained constant.

8 Claims, 4 Drawing Figures

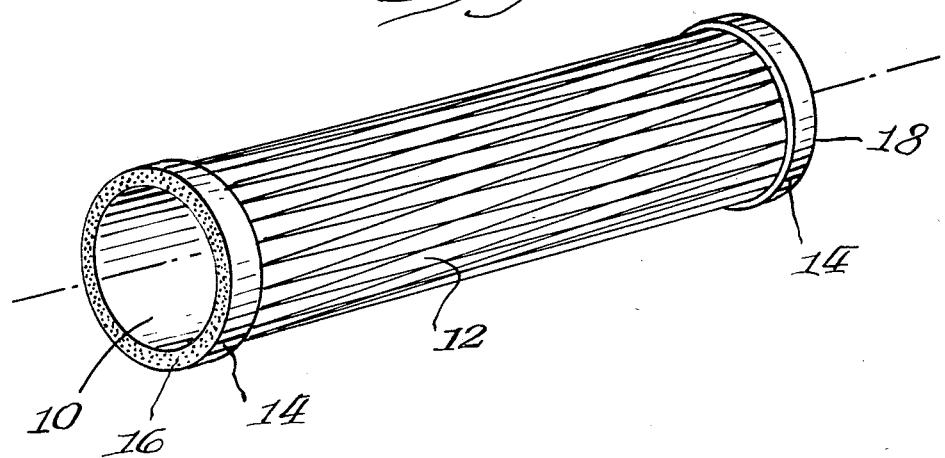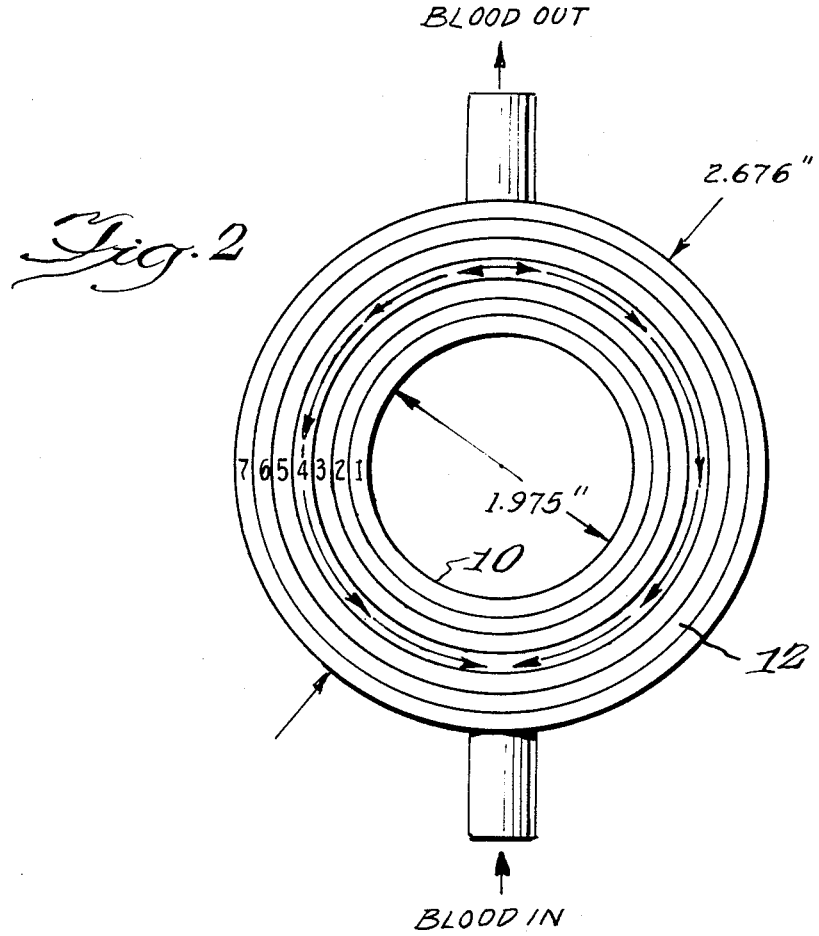

PROCESS FOR MAKING A FIBER BUNDLE

TECHNICAL FIELD

The present invention concerns a novel process for making a fiber bundle. The illustrative embodiment concerns a novel process for making a hollow fiber mass transfer device bundle and also concerns a novel mass transfer device bundle.

BACKGROUND ART

In U.S. Pat. No. 3,794,468, issued Feb. 26, 1974, in the name of Ronald J. Leonard for "Mass Transfer Device Having a Wound Tubular Diffusion Membrane" and assigned to the assignee of the present invention, a mass transfer device is disclosed. The mass transfer device disclosed in that patent is made by winding a length of a hollow tubular conduit of semipermeable membrane about a core to form a wound bundle similar to packages of kite string, in which individual adjacent windings in the same layer are generally parallel to each other, but individual adjacent windings of the conduit in adjacent layers define an angle to each other. The device of that patent is assembled by winding a length of the hollow tubular conduit of semipermeable membrane about a core in a plane which defines an acute angle to the longitudinal axis and intersects both ends of the core. Simultaneously, the core is rotated about its longitudinal axis, or the plane of winding is correspondingly rotated to the same effect, to laterally displace on the core each winding of conduit from its immediately preceding winding. The resulting wound structure allows a low cost construction of a high performance mass transfer device. The flow pattern is around the circumference of the cylindrical element formed by the winding process. However, as the flow gas around the circumference, it will encounter flow paths of different length. Additionally, since the core is rotated at a constant rotation velocity and the angular velocity of the wind is constant, the void fraction of the resulting structure increases radially outwardly of the bundle. In other words, the void fraction near the outside of the bundle will be greater than the void fraction on the inside of the bundle. As used herein, the term "void fraction" connotes the ratio of space to space and fiber, whereby a greater void fraction means more space.

We have discovered that performance of the mass transfer device is decreased if the void fraction near the outside of the bundle is substantially greater than the void fraction near the inside of the bundle. If the mass transfer device is an oxygenator, for example, having a void fraction on the outside that is substantially larger than the void fraction on the inside results in a much larger blood flow rate on the outside because there is more resistance on the inside. As the void fraction on the outside becomes smaller, there is less flow rate on the outside. However, since the flow path on the outside is inherently longer than the flow path on the inside, if the void fraction were equal throughout the bundle, the flow rate on the outside would not be equal to the flow rate on the inside but the blood flow would be unequal because of the longer flow path on the outside.

We have discovered than an optimum hollow fiber oxygenator comprises a bundle in which the flow rate is substantially constant throughout the bundle, the blood outlet saturation is substantially constant throughout the bundle, and the void fraction increases slightly in the radial outward direction of the bundle. The present invention provides a novel process for obtaining this optimum device and also concerns a novel device having these optimum properties.

Although the illustrative embodiment of the invention relates to a hollow fiber mass transfer device such as an oxygenator, it is to be understood that the present invention may be applicable to other devices using other fibers. For example, the present invention could be used with non-permeable tubing such as employed in a heat exchanger. Further, the present invention could be used with an absorption filter, using an absorbant filter material such as polyesters or natural fibers. Other impregnated fibers could be employed in connection with the present invention.

DISCLOSURE OF THE INVENTION

In accordance with the present invention, a process is provided for making a fiber bundle. The process comprises the steps of providing a core having a longitudinal axis, winding a length of the fiber around the core from an arm in a plane that is at an acute angle with respect to the longitudinal axis of the core and is between opposite ends of the core, providing relative circumferential rotation between the core and the position of the winding arm, and, during winding of the fiber around the core, changing the ratio of (a) the angular velocity of the wind and (b) the relative rotational velocity between the longitudinal axis of the core and the position of the winding arm.

In the illustrative embodiment, the ratio-changing step comprises the step of increasing the ratio during winding whereby the void fraction of radially-outward annuli of the wound bundle is less than the void fraction would be if the ratio remained constant.

In the illustrative embodiment, the outer 10 percent annulus of the bundle is wound at a ratio that is at least 5 percent greater than the ratio at which the inner 10 percent annulus is wound.

In the illustrative embodiment, the process is used for making a hollow fiber mass transfer device. The mass transfer device comprises a core with a hollow fiber bundle overlying the core and in symmetrical relationship to the longitudinal axis of the core.

A more detailed explanation of the invention is provided in the following description and claims, and is illustrated in the accompanying drawings.

BRIEF DESCRIPTION OF THE DRAWINGS

FIG. 1 is a perspective view of a mass transfer device bundle, prior to its being enclosed within a housing, constructed in accordance with the principles of the present invention.

FIG. 2 is a diagrammatic cross-sectional view of a wound bundle.

DETAILED DESCRIPTION OF THE ILLUSTRATIVE EMBODIMENT

Figure 3:
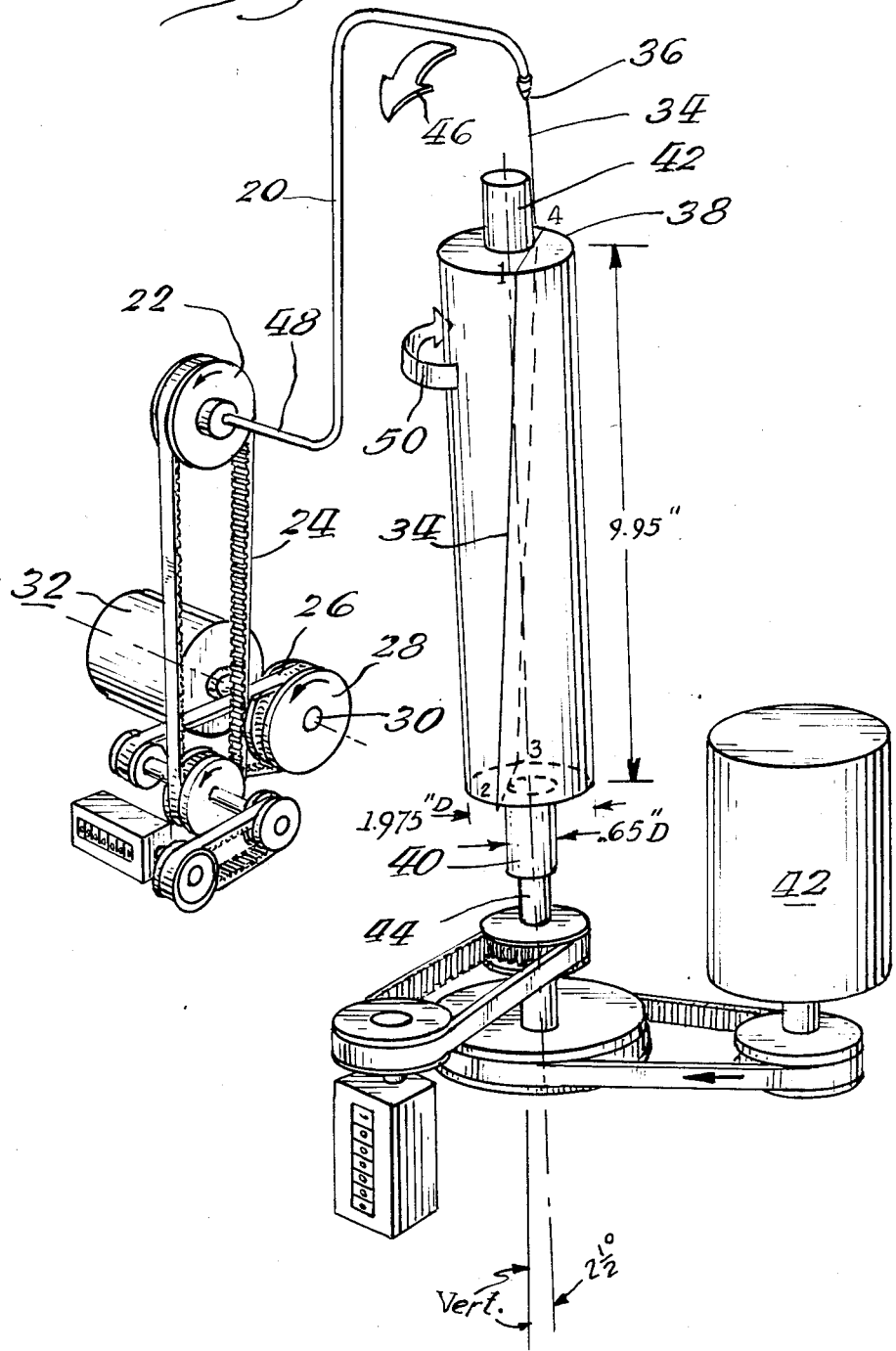
FIG. 3 is a perspective view of a core and winding mechanism.
Figure 4:
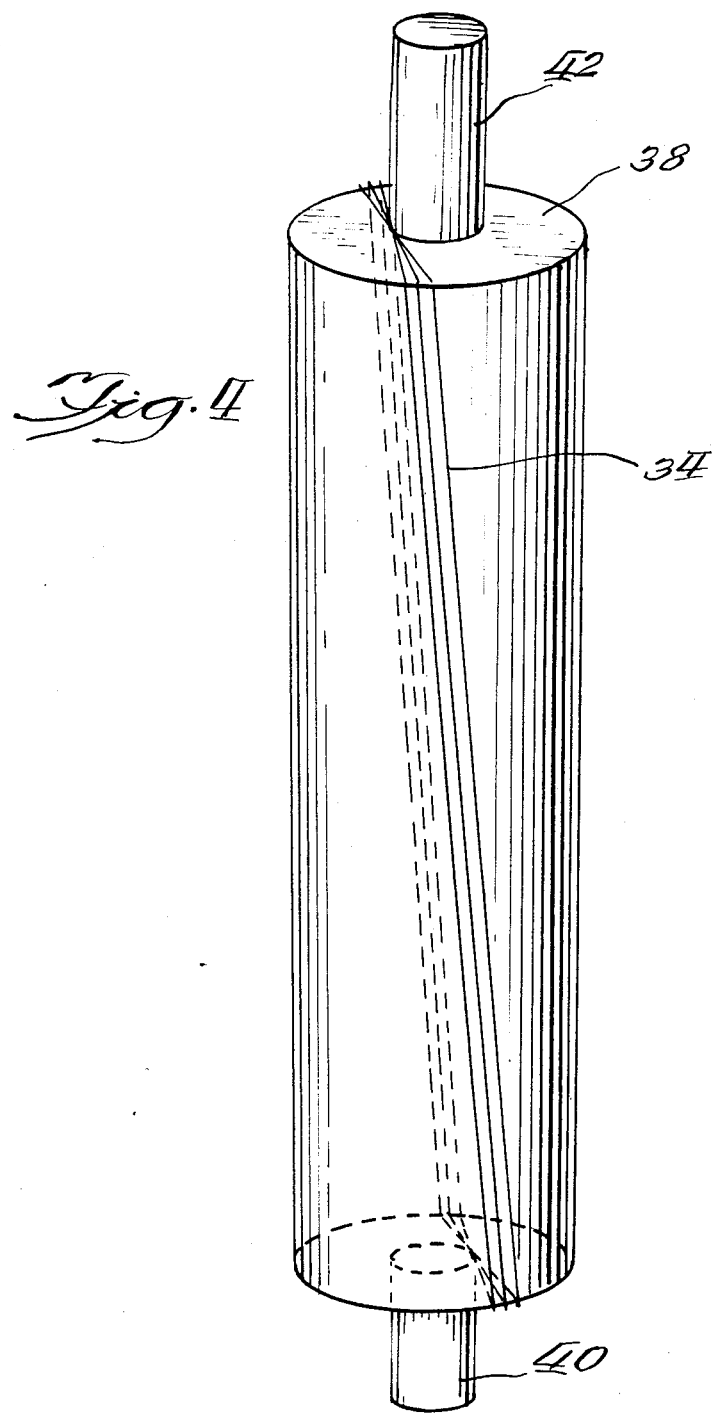
FIG. 4 is a perspective view of a core for the purpose of showing a winding layout.

Referring to FIG. 1, a core 10 having a bundle 12 formed by winding a hollow fiber around core 10 is illustrated. FIG. 1 shows bundle 12 in a condition after the hollow fiber has been wound around the core 10, sealant bands 14 have been applied around the bundle,

| ANNULUS NO. | WINDING RATIO | VOID FRACTION | FLOW RATE | SATURATION PERCENT | PRESSURE DROP |
|---|---|---|---|---|---|
| 7 | 388:1 | .65 | 12.7 | 111.0 | 99.2 |

However, this bundle is not deemed optimum because the flow path lengths are more different than desired. A more ideal bundle has been developed in which the void fraction is not constant but is less variable throughout the bundle than would be if the winding ratio remained constant, the flow rate is substantially constant, and the blood saturation percentage is substantially constant. This more ideal bundle is wound using the following average winding ratio for the corresponding annuli of FIG. 2.

| ANNULUS NO. | WINDING RATIO | VOID FRACTION | FLOW RATE | SATURATION PERCENT | PRESSURE DROP |
|---|---|---|---|---|---|
| 1 | 333:1 | .6175 | 14.3 | 103.9 | 99.9 |
| 2 | 338:1 | .6291 | 14.3 | 103.9 | 99.9 |
| 3 | 342:1 | .6400 | 14.3 | 103.9 | 99.9 |
| 4 | 346:1 | .6501 | 14.2 | 103.9 | 99.9 |
| 5 | 351:1 | .6595 | 14.3 | 103.9 | 99.9 |
| 6 | 355:1 | .6682 | 14.3 | 103.9 | 99.9 |
| 7 | 359:1 | .6765 | 14.3 | 103.9 | 99.9 |

It can be seen that a process has been disclosed for making a bundle in which the flow rate is substantially constant throughout the bundle, the blood outlet saturation is substantially constant throughout the bundle, and the void fraction increases slightly in the radially outward direction of the bundle. It is preferred that the outer ten percent annulus of the bundle be wound at a winding ratio that is at least five percent greater than the ratio at which the inner ten percent annulus is wound.

In the charts set forth above, the flow rate is in cubic centimeters per second and the pressure drop is in millimeters of mercury.

The invention is applicable to other devices using other fibers. Although illustrative embodiments of the invention have been shown and described, it is to be understood that various modifications and substitutions may be made by those skilled in the art without departing from the novel spirit and scope of the present invention.

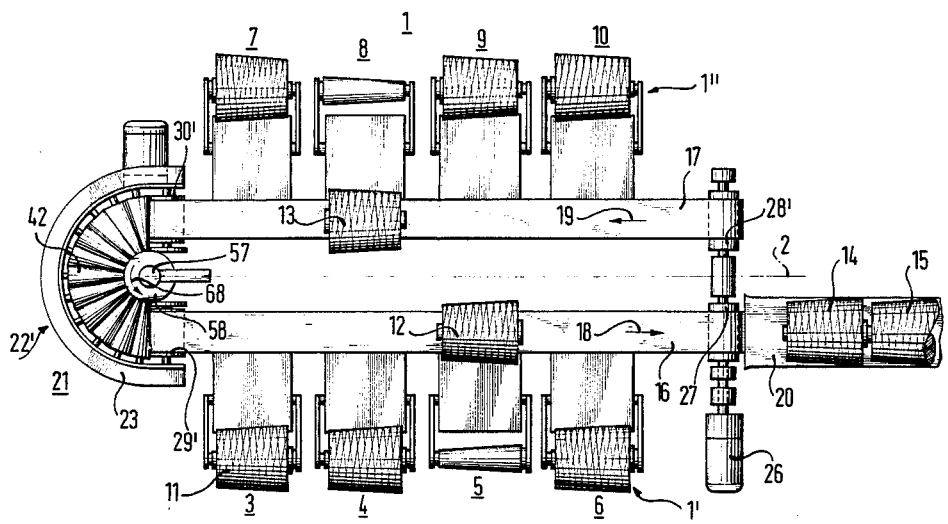

What is claimed is:

1. In a process for making a hollow fiber mass transfer device in which a bundle, having a void fraction of radially outward annuli, is formed by winding at an angular velocity a length of hollow fiber around a core end over end from an arm in a plane that is at an acute angle with respect to the longitudinal axis of the core and is between opposite ends of the core, the improvement comprising the steps of:
   providing relative circumferential rotation between the core and the position of the winding arm; and
   during winding of the hollow fiber around the core end over end, increasing the ratio of (a) the angular velocity of the wind and (b) the relative rotational velocity between the longitudinal axis of the core and the position of the winding arm whereby the void fraction of radially-outward annuli of the wound bundle is less than the void fraction would be if the ratio remained constant and whereby an annular flow rate is more constant than if the ratio remained constant.

2. In a process as described in claim 1, wherein the outer 10 percent annulus of the bundle is wound at a ratio that is at least 5 percent greater than the ratio at which the inner 10 percent annulus is wound.

3. In a process as described in claim 1, wherein the ratio changing step comprises the step of increasing the ratio during winding so that (a) the void fraction of radially-outward annuli of the wound bundle is less than the void fraction would be if said ratio remained constant, (b) the annular flow rate remains substantially constant, and (c) the outlet saturation remains substantially constant.

4. In a process as described in claim 3, wherein the outer 10 percent annulus of the bundle is wound at a ratio that is at least 5 percent greater than the ratio at which the inner 10 percent annulus is wound.

5. In a process as described in claim 1, including the step of positioning the core on a spindle coaxial with the longitudinal axis of the core, winding the hollow fiber in a manner so that each wind extends from within a plane that is on one side of the spindle to a plane that is on the other side of the spindle and then back to a plane on said one side of the spindle.

6. In a process for making a hollow fiber mass transfer device in which a bundle having a void fraction of radially outward annuli, is formed by winding a length of hollow fiber end over end around a core from an arm in a plane that is at an acute angle with respect to the longitudinal axis of the core and is between opposite ends of the core, the improvement comprising the steps of:
   positioning the core on a spindle coaxial with the longitudinal axis of the core;
   providing relative circumferential rotation between the core and the position of the winding arm;
   winding at an angular velocity the hollow fiber in a manner so that each wind extends from within a plane that is on one side of the spindle to a plane that is on the other side of the spindle and then back to a plane on said one side of the spindle;
   during winding of the hollow fiber end over end around the core, increasing the ratio of (a) the angular velocity of the wind and (b) the relative rotational velocity between the longitudinal axis of the core and the position of the winding arm, whereby the void fraction of radially-outward annuli of the wound bundle is less than the void fraction would be if said ratio remained constant, an annular flow rate of the bundle is substantially constant, and an outlet saturation of the bundle is substantially constant.

7. A process for making a fiber bundle, having a void fraction of radially outward annuli, comprising the steps of:
   providing a core having a longitudinal axis;
   winding at an angular velocity a length of the fiber around the core end over end from an arm in a plane that is at an acute angle with respect to the longitudinal axis of the core and is between opposite ends of the core;
   providing relative circumferential rotation between said core and the position of the winding arm;
   during winding of the fiber around the core end over end, increasing the ratio of (a) the angular velocity of the wind and (b) the relative rotational velocity between the longitudinal axis of the core and the position of the winding arm whereby the void fraction of radially-outward annuli of the wound bundle is less than the void fraction would be if the ratio remained constant.

8. A process as described in claim 7, wherein the outer 10 percent annulus of the bundle is wound at a ratio that is at least 5 percent greater than the ratio at which the inner 10 percent annulus is wound.

* * * * *

United States Patent [19]

Raasch

[11] Patent Number: 4,572,447
[45] Date of Patent: Feb. 25, 1986

[54] DOUBLE-SIDED TEXTILE MACHINE

[75] Inventor: Hans Raasch, Monchen-Gladbach, Fed. Rep. of Germany

[73] Assignee: W. Schlafhorst & Co., Monchen-Gladbach, Fed. Rep. of Germany

[21] Appl. No.: 648,895

[22] Filed: Sep. 10, 1984

[30] Foreign Application Priority Data

Sep. 8, 1983 [DE] Fed. Rep. of Germany ....... 3332409

[51] Int. Cl.$^4$ .................. B65H 54/20; B65H 67/06
[52] U.S. Cl. .......................... 242/35.5 A; 193/35 S; 198/457; 198/787
[58] Field of Search .................. 242/35.5 A, 35.5 R, 242/35.6 R; 198/457, 580, 611, 339, 787, 951; 193/35 R, 35 S, 37

[56] References Cited

U.S. PATENT DOCUMENTS

| | | | |
|---|---|---|---|
| 790,776 | 5/1905 | Alvey | 193/35 S |
| 1,287,170 | 12/1918 | Younkman | 193/35 S |
| 3,189,161 | 6/1965 | Schneider et al. | 198/787 |
| 3,369,646 | 2/1968 | Musser | 198/787 |
| 3,724,643 | 4/1973 | Kohl | 198/787 |
| 4,496,110 | 1/1985 | Raasch et al. | 242/35.5 A |

*Primary Examiner*—Stanley N. Gilreath

*Attorney, Agent, or Firm*—Herbert L. Lerner; Laurence A. Greenberg

[57] ABSTRACT

A double-sided textile machine, includes a plurality of bobbin assemblies between first and second ends of the textile machine for producing cross-wound bobbins; a device for collecting and transporting the bobbins produced in the bobbin assemblies, including a bobbin collection station in vicinity of the first end of the machine, a first bobbin transport belt for receiving bobbins axially aligned in a first transport direction from a first side of the machine and for moving the bobbins toward the collection station in the first transport direction, a second bobbin transport belt similar to the first transport belt for receiving bobbins axially aligned in a second transport direction opposite the first transport direction from a second side of the machine and for moving the bobbins away from the collection station in the second transport direction, a substantially semicircular device in vicinity of the second end of the machine for sequentially removing bobbins from the second transport belt, for turning the bobbins through substantially 180° and for transporting the bobbins onto the first transport belt, the substantially semicircular device including a roller conveyor having tapered rollers accelerating the bobbins.

14 Claims, 4 Drawing Figures